United States Patent
Walsh et al.

(10) Patent No.: US 6,539,087 B1
(45) Date of Patent: Mar. 25, 2003

(54) AUDIO CONFERENCING SYSTEM

(75) Inventors: Bruce E. Walsh, Londonderry, NH (US); Philip J. Baun, Jr., Andover, MA (US); Robert S. Horne, Littleton, MA (US); Paul P. Martel, Newburyport, MA (US); John T. Watson, Derry, NH (US)

(73) Assignee: Spectel Operations, Limited, Dublin (IR)

( * ) Notice: Subject to any disclaimer, the term of this patent is extended or adjusted under 35 U.S.C. 154(b) by 0 days.

(21) Appl. No.: 09/715,906

(22) Filed: Nov. 17, 2000

Related U.S. Application Data

(60) Provisional application No. 60/165,984, filed on Nov. 17, 1999.

(51) Int. Cl.[7] .................................................. H04M 3/42
(52) U.S. Cl. .................................................. 379/202.01
(58) Field of Search .................................. 370/260–266; 379/202.01–205.01

(56) References Cited

U.S. PATENT DOCUMENTS

| | | | |
|---|---|---|---|
| 4,945,534 A | 7/1990 | Driscoll et al. | 370/62 |
| 5,276,678 A | 1/1994 | Hendrickson et al. | 370/62 |
| 5,408,526 A | 4/1995 | McFarland et al. | 379/202 |
| 5,495,522 A | 2/1996 | Allen et al. | 379/202 |
| 5,526,413 A | 6/1996 | Cheston, III et al. | 379/201 |
| 5,689,553 A | * 11/1997 | Ahuja et al. | 379/202 |
| 5,719,928 A | * 2/1998 | Pinnell et al. | 379/202 |
| 5,761,292 A | * 6/1998 | Wagner et al. | 379/229 |
| 5,812,652 A | * 9/1998 | Jodoin et al. | 379/205 |
| 6,181,786 B1 | * 1/2001 | Detampel, Jr. et al. | 379/205 |

FOREIGN PATENT DOCUMENTS

| | | | |
|---|---|---|---|
| CA | 2226347 | 9/1998 | |
| EP | 0 805 582 A2 | 11/1997 | |
| EP | 0 805 582 | * 11/1997 | H04M/3/56 |

* cited by examiner

*Primary Examiner*—Ahmad F. Matar
*Assistant Examiner*—Hector Agdeppa
(74) *Attorney, Agent, or Firm*—Foley Hoag, LLP

(57) ABSTRACT

According to the principles of the invention, there is provided a conferencing system that dynamically assigns calls to DSP resources. The system may attempt to process each audio conference on a single DSP node, so that information about conference participants does not need to be shared across DSP nodes. Further, the mapping of call channels to resources within a DSP node may be automated so that it is transparent to a conferencing system control application. Where more than one DSP node is required for a particular conference, there is further provided a system for linking DSP nodes. There are also provided methods for managing audio conferencing resources.

24 Claims, 7 Drawing Sheets

US 6,539,087 B1

AUDIO CONFERENCING SYSTEM

RELATED APPLICATIONS

This application claims priority to, and incorporates by reference, the entire disclosure of U.S. Provisional Patent Application No. 60/165,984, filed on Nov. 17, 1999.

BACKGROUND OF THE INVENTION

Telephone conferencing systems have been available for many years. An audio conferencing system may include an audio bridge that connects calls or lines to particular system resources for processing. An audio bridge may include, for example, a processor that controls the system, a plurality of digital signal processing ("DSP") nodes that perform call processing, a plurality of network interface connections that connect to call participants, and a time division multiplexing ("TDM") bus for transmitting conference information to and from the DSP nodes. A conferencing system including these components is described, for example, in U.S. Pat. No. 5,495,522, entitled "Method and Apparatus for Audio Teleconferencing a Plurality of Phone Channels," the disclosure of which is incorporated herein by reference.

As a significant disadvantage, conventional conferencing systems impose geometric increases in switching complexity as call volume increases. That is, each additional call connection may require an additional DSP unit, adding one connection to both the input and the output of intermediate switching circuitry. There remains a need for an audio conferencing architecture that can be more readily scaled to address increasing call capacity.

SUMMARY OF THE INVENTION

According to the principles of the invention, there is provided a conferencing system that dynamically assigns calls to DSP resources. The system may attempt to process each audio conference on a single DSP resource, so that information about conference participants does not need to be shared across DSP resources. Further, the mapping of call channels to resources within a DSP resource may be automated so that it is transparent to a conferencing system control application. Where more than one DSP resource is required for a particular conference, there is further provided a system for linking DSP resources. There are also provided methods for managing audio conferencing resources.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF THE PREFERRED EMBODIMENT(S)

To provide an overall understanding of the invention, certain illustrative embodiments will now be described, including an audio conferencing system that dynamically allocates call resources. However, it will be understood by those of ordinary skill in the art that the methods and systems described herein may be suitably adapted to other environments where switched access to audio processing resources is provided, such as a voice mail system or a private branch exchange. All such adaptations and modifications that would be clear to one of ordinary skill in the art are intended to fall within the scope of the invention described herein.

Figure 1:
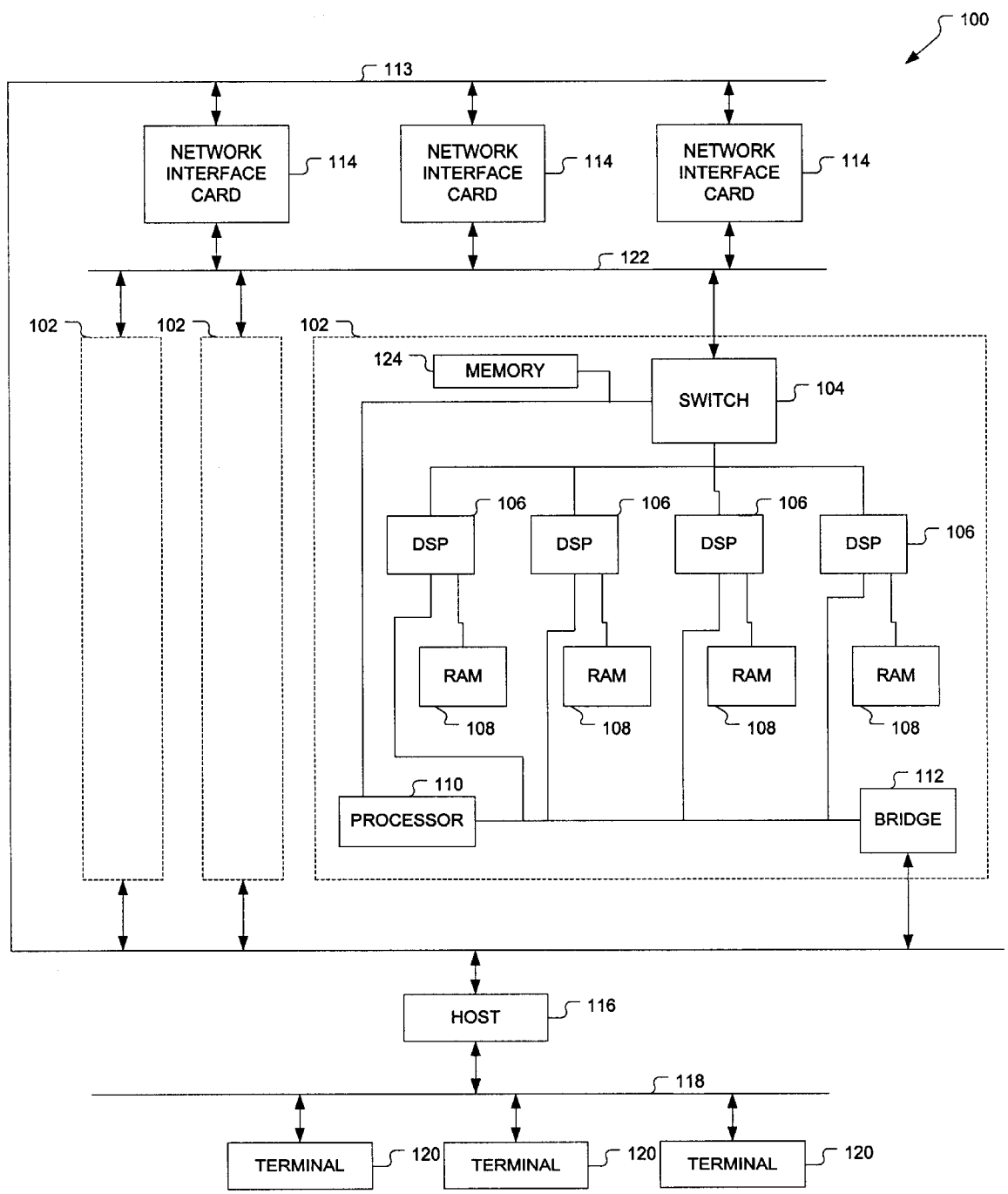
FIG. 1 is a block diagram of an audio conferencing system according to the principles of the invention.

FIG. 1 is a block diagram of an audio conferencing system according to the principles of the invention. A system 100 includes one or more digital signal processing ("DSP") units 102, each DSP unit 102 including a switch 104, a plurality of DSP resources 106, a memory 108 associated with each DSP resource 106, a processor 110, and a bridge 112. A first bus 113 interconnects the bridge 112 of each DSP unit 102 with one or more network interface cards 114 and a host 116. A second bus 118 connects the host 116 to one or more terminals 120, and a third bus 122 connects the DSP units 102 with the network interface cards 114 in a communicating relationship.

The terminals 120 may be a personal computer, or any other computing device suitable for receiving user input and communicating with the host 116 over the second bus 118. The second bus 118 may include a local area network, or any other network or connection suitable for communicating data between the terminals 120 and the host 116. The host 116 may be, for example, a computer using a 300 MHz Pentium II with 192 Mb of random access memory. The host may control operation of the DSP units 102 and the network interface cards ("NICs") 114. The first bus 113 that connects the host 116 to the network interface cards 114 and the DSP units 102 may be, for example, a compact Peripheral Component Interconnect ("cPCI") bus. The third bus 122 that connects the network interface cards 114 to the DSP units 102 may be, for example, an H.110 bus using cPCI. It will be appreciated that a number of protocols and hardware specifications are known in the art, and may be used to connect components of the system 100 in a communicating relationship, including without limitation H.100, H.110, SCBus, HMVIP, MVIP, ANSI VITA 6, ISA/EISA, PCI, cPCI, and so forth.

Each network interface card 114 is coupled to one or more lines (not shown). This may include connections to an external communication network such as the Public Switched Telephone Network ("PSTN") or some private network through one or more communication ports (not shown) such as T1 connections, or any other trunk level (T-_) digital signal level (DS-_) optical (OC-), or other communication connection based upon a wired, wireless, or fiber optic medium. Each network interface card 114 may operate under control of the host 116 to selectively couple time slots on the third bus 122 (where the third bus 122 is, for example, a TDM-based H.110 bus) with the communication ports of the network interface card 114. In an embodiment, each network interface card 114

Each DSP unit 102 may include a switch 104 for selectively coupling to the third bus 122, such that data may pass from the communication ports of the network interface cards 114 to the switch 104, where data may be further sent to, and received from, DSP resources 106. A processor 110 may receive control information from the host 116, and in response thereto, or independently, control operation of the switch 104 and the DSP resources 106 to achieve conferencing and other audio and telephonic functions. Each DSP resource 106 may have access to every channel connected to the switch 104, such as all of the time slots of an H.110 bus. Each DSP resource 106 may also process a number of channels at one time, such as 64 duplex time slots. In addition, some portion of each DSP resource's processing capability may be reserved for channels from other DSP units 102, or for other processing functions that do not operate directly on communication channels. Each DSP unit 102 may include a bridge 112 for connecting the DSP unit 102 in a communicating relationship with the host 116 through the first bus 113. Through this connection, the host 116 may access data stored in each memory 108, and provide control information to each DSP resource 106 as well as the switch 104. Each memory 108 may be used to temporarily store results of operations performed by the associated DSP resource 106. A memory 124 including, for example, a read only memory and a dynamic random access memory, may be provided to store boot data and for use by the processor for use by the processor 110 during operation of the DSP unit 102. The memory 124 may also be accessed by the host 116.

It will be appreciated that each of the DSP units 102 of FIG. 1 may include identical or similar circuitry and functionality, although only one of the DSP units 102 is shown in detail. In one embodiment, each DSP unit 102 is an SP-6040 Intelligent I/O Subsystem available from Radisys, and includes an Intel i960 processor, one or more TMS300C6201 chips from Texas Instruments as DSP resources, a T8105 chip from Lucent Technologies as a switch, and a cPCI interface as a bridge.

Figure 2:
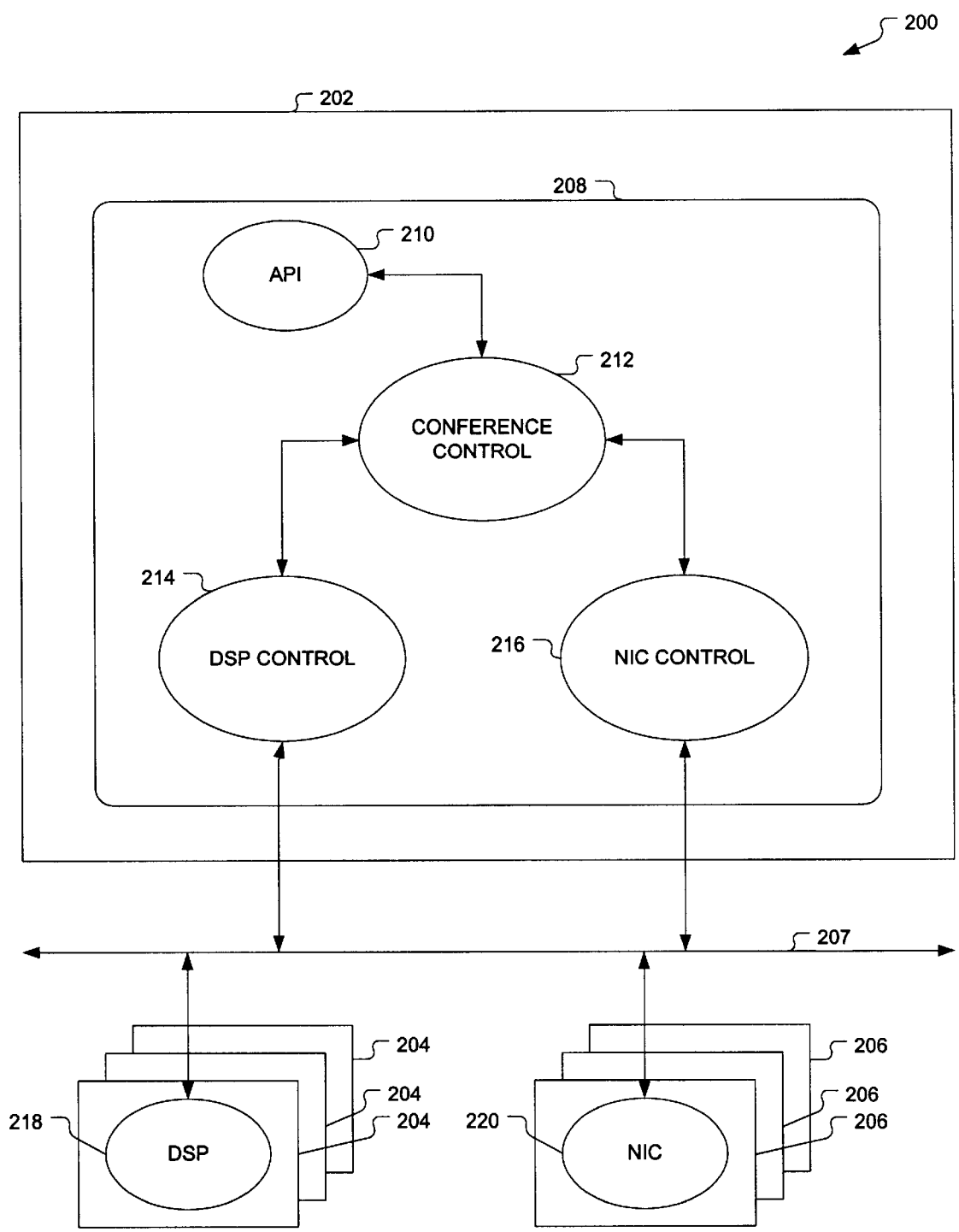
FIG. 2 is a block diagram of audio conferencing software that may be used with the system of FIG. 1.

FIG. 2 is a block diagram of audio conferencing software that may be used with the system of FIG. 1. The system 200 may include a host processor 202, such as the host 116 of FIG. 1, a plurality of DSP cards 204, such as the DSP units 102 of FIG. 1, and a plurality of network interface ("NIC") cards 206, such as the network interface cards 114 of FIG. 1. The DSP cards 204, NIC cards 206, and host processor 202 may be physically interconnected by a bus 207, such as a cPCI bus. The host processor 202 may include a conference control system 208 running as one or more processes or computer programs. The conference control system 208 may include one or more application programming interfaces 210, a conference control 212, a DSP control 214, and an NIC control 216. Each DSP card 204 may include a DSP process 218, and each NIC card 206 may include an NIC process 220.

The one or more APIs 210 provide an interface for accessing the conference control 212 from other processes, such as programs executing on the terminals 120 of FIG. 1 and communicating with the host processor 202 through a local area network. The APIs 210 may be accessed by conference operators or moderators for monitoring and control of conferences within the system 100.

The conference control 212 may generally control operation of the system 100, in response to commands received through the one or more APIs 210, as well as automatically where predetermined management functions may be performed without explicit operator or moderator commands. The conference control 212 may include a call handler that manages each telephonic input line through, for example, a state machine for each line.

An NIC control 216 operates under control of the conference control 212, and may include, for example, an NIC driver, a net manager, a net event, and a net handler. These components provide an interface to the NIC cards 206 for the conference control 212, and may be provided by a manufacturer of an NIC card in a form suitable to the host processor 202, or adapted to the host processor 202.

A DSP control 214 operates under control of the conference control 212, and may include, for example, DSP driver, an enunciator, an event queue, and channel command modules. The DSP driver controls access to DSP I/O command registers, provides interrupt handling, and stores address information for a shared memory that may be used by the DSP cards 204 and the conference control 212. The enunciator may control the use of channels for play back of pre-recorded announcements, such as when a caller enters a conference. The event queue handles messages from DSP processes 218 on the DSP cards 204. The channel command modules receive commands from the conference control, either initiated by the call manager or received through the APIs 210, and passes them along to the DSP driver. Commands may include, for example, start enunciator, stop enunciator, dial a number, and so forth.

The call handler within the conference control 212 may perform a number of functions related to the management of DSP resources. For example, the call handler may initiate and close conferences. The call handler may position conferences evenly across DSP cards 204 and DSP resources 106 (FIG. 1) within DSP cards 204. The call handler may add and drop calls from a conference, reassign logical channels to different DSP resources 106, dial numbers, play tones, mute calls, provide automatic gain control, and play music.

It will be appreciated that each of the software components described above may be computer executable code created using a structured programming language such as C or FORTRAN, an object oriented program such as C++, Visual Basic, or Java, or an assembly or machine code, or some combination of these. Each component may be a compiled, or interpreted. Further, each component, or subcomponents and modules thereof, may reside on a single device, or may be distributed across a number of devices that communicate using the Distributed Component Object Model ("DCOM") and/or any suitable network protocol.

Figure 3:
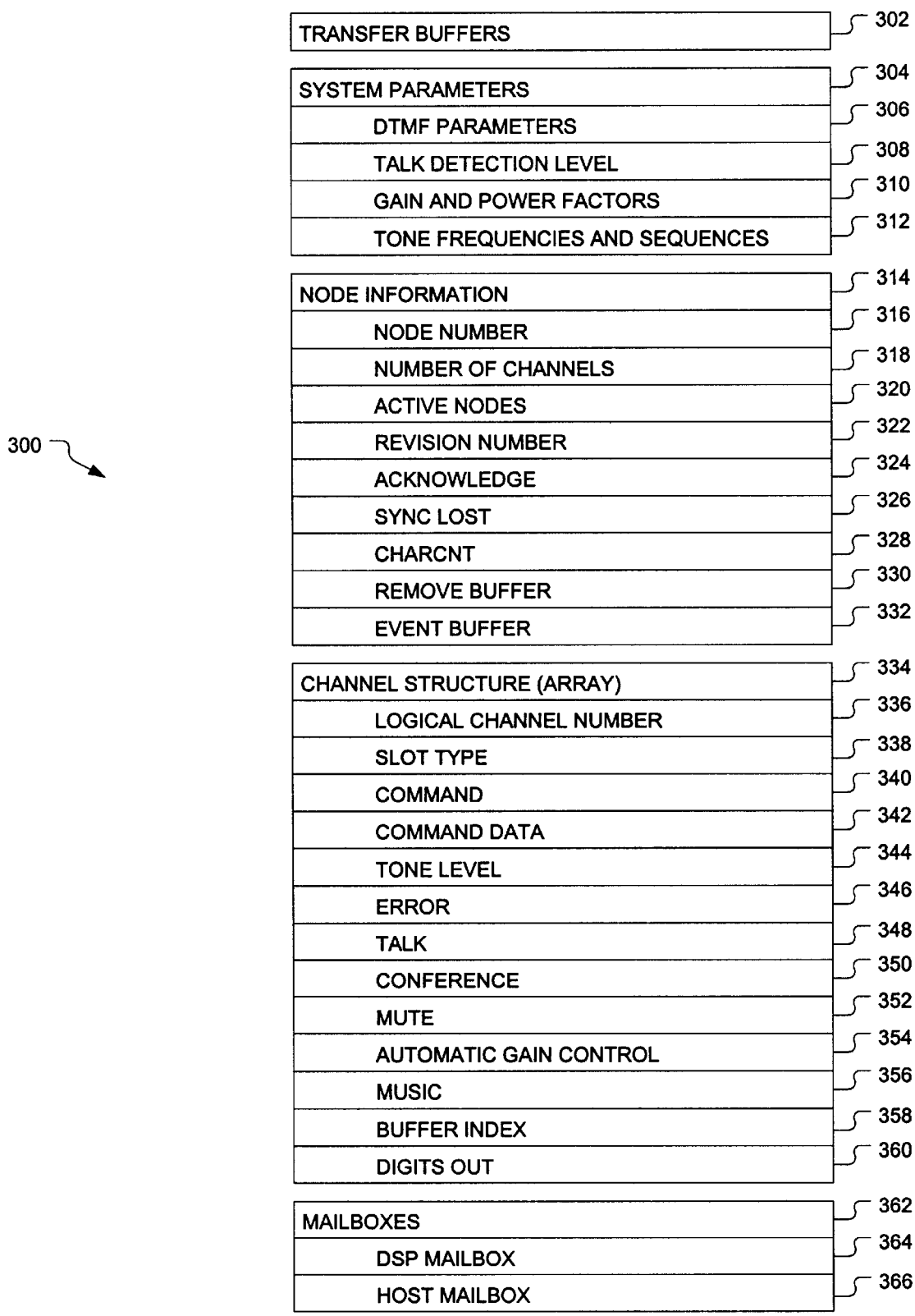
FIG. 3 depicts the data structure associated with a DSP unit.

FIG. 3 depicts the data structure associated with a DSP unit. The data structure 300 may reside in the memory 108 of each DSP resource 106. Access to the data structure 300 may be limited to the DSP resource 106 associated with the memory 108, and the host 116, using, for example, direct memory access. The data structure 300 may be organized as a library structure that includes, for example, mapping of logical channels to physical resources and the state of each DSP resource. This mapping information may only be visible to the Conference System hardware and not to the application software.

The data structure 300 may include a number of transfer buffers 302. The transfer buffers may be, for example, thirty-two quad data transfer buffers used as a receive pair and a transmit pair for the transfer of data during record and playback operations. The size of each buffer may be one-thousand twenty four bytes. Separate host and DSP semaphores may be used to monitor access to each buffer.

The data structure 300 may include system parameters 304, such as Dual Tone Multi-Frequency ("DTMF") parameters 306, a talk detection level 308, gain and power factors 310, and tone frequencies and sequences 312. The DTMF parameter 306 may define the detection of valid DTMF tones by the system. The talk detection level 308 may specify an amplitude or power at which talking is indicated upon a channel. The gain and power factors 310 may specify scaling factors for conferencing system traffic. Tone frequencies and sequences 312 may specify particular types and orders of tones that indicate predetermined events or control data, such as entering or exiting a conference, or DTMF signaling.

The data structure 300 may include node information 314, such as a node number 316, a number of channels 318, active nodes 320, revision number 322, acknowledge 324, sync lost 326, charcnt 328, a remove buffer 330, and an event buffer 332. The node number 316 may be a number assigned to a DSP unit 102 associated with the data structure 300 by the host 116 when the system is initialized. The number of channels 318 may be a number of conferencing channels available on the DSP resource 106, and may be set by the host 116 upon initialization of the system. The active nodes 320 may be, for example, a bitmask of currently active DSP resources 106. A revision number 322 may be used to specify a version of software currently operating on the DSP resource 106, the DSP unit 102, or the system 100. An acknowledge 324 may be used as a flag, for example, that may be set by the host and reset or cleared by the DSP resource 106 for error checking or to synchronize certain operations. A sync lost 326 may be used as a counter to track, for example, real time missed by a DSP resource 106 if a frame is missed. The charcnt 328 may be used for debugging purposes. The remove buffer 330 may be configured as a circular buffer that contains a head index set by the host 116, a tail index set by the DSP resource 106, and a list of timeslots to be removed from a conference talk list. The remove buffer 330 may also store, for each timeslot to be removed, a new or existing conference destination for the timeslot. The even buffer 332 may be a circular buffer that includes a head index set by the host 116, a tail index set by the DSP resource 106, and a buffer containing a list of events and the timeslot for which each event occurred.

The data structure 300 may include an array of channel structures 334 for tracking data for each channel within a DSP resource 106. The channel structure 334 may include a logical channel number 336, a slot type 338, a command 340, command data 342, a tone level 344, an error 346, a talk 348, a conference 350, a mute 352, automatic gain control ("AGC") 354, a music 356, a buffer index 358, and digits out 360. The logical channel number 336 specifies a logical number assigned to a channel for purposes of reference and debugging. The logical channel number 336 may be assigned, for example, by the host 116. A slot type 338 may be set by the host 116 to identify the timeslot origin. The slot type 338 may further specify a use for the timeslot, for example, a network, an internal link, a voice-over-Internet-Protocol user, an operator, a link line, an enunciator, a music source, or the like. The command 340 may be set by the host 116, and cleared by the DSP resource 106 when ready for a new command. The DSP resource 106 may also store an error indicator, or other DSP resource 106 responses such as a ready indicator or a host interrupt. The command data 342 may contain data associated with a command, such as a tone type, tone frequency, or the like. The tone level 344 may specify a volume for tones within a channel using, for example, decibels, dBm, or some other units, when a tone generation is specified for the channel. The error 346 may be a flag set by the DSP resource 106 when the DSP resource 106 detects an invalid command. The talk 348 may be set by the DSP resource 106 when talk is detected on the channel. The conference 350 maybe set by the host 116 to specify a conference for the channel or a timeslot associated with the channel. The mute 352 may be set by the host 116 to mute incoming voice data. The automatic gain control 354 may be set by the host 116 to specify that AGC is to be applied to a channel, and may include other AGC parameters. The music 356 may be set by the host 116 to specify a time slot to be used as a music source for the current channel. The music 356 may also be set by the host 116 to specify that no music is to be provided. The buffer index 358 is used to specify transfer buffers 302 used for the channel. The digits out 360 may be used to store a number of digits to be dialed for the channel.

The data structure 300 may also include a number of mailboxes 362. The mailboxes may include, for example, a DSP mailbox 364 and a host mailbox 366. The DSP mailbox 364 may be used to store interrupts issued by the host 116 to the DSP resource 106 before they are handled by the DSP resource 106. The host mailbox 366 may be used to store interrupts issued by the DSP resource 106 to the host 116 before they are handled by the host 116.

In one embodiment, the data structure 300 is stored in a random access memory associated with each DSP resource 106, and accessible to the host 116 using, for example, direct memory access. However, it will be appreciated that any volatile or nonvolatile memory may be used to store the data structure 300 described above, provided that the memory has sufficient capacity to store required system information, and provided that the memory has sufficient speed to satisfy any real-time or other constraints of the audio conferencing system 100. The data structure 300 described above, and the data contained therein, is available to the host 116, and to the DSP resource 106, such that the following methods described in FIGS. 4–7 may be performed.

Figure 4:
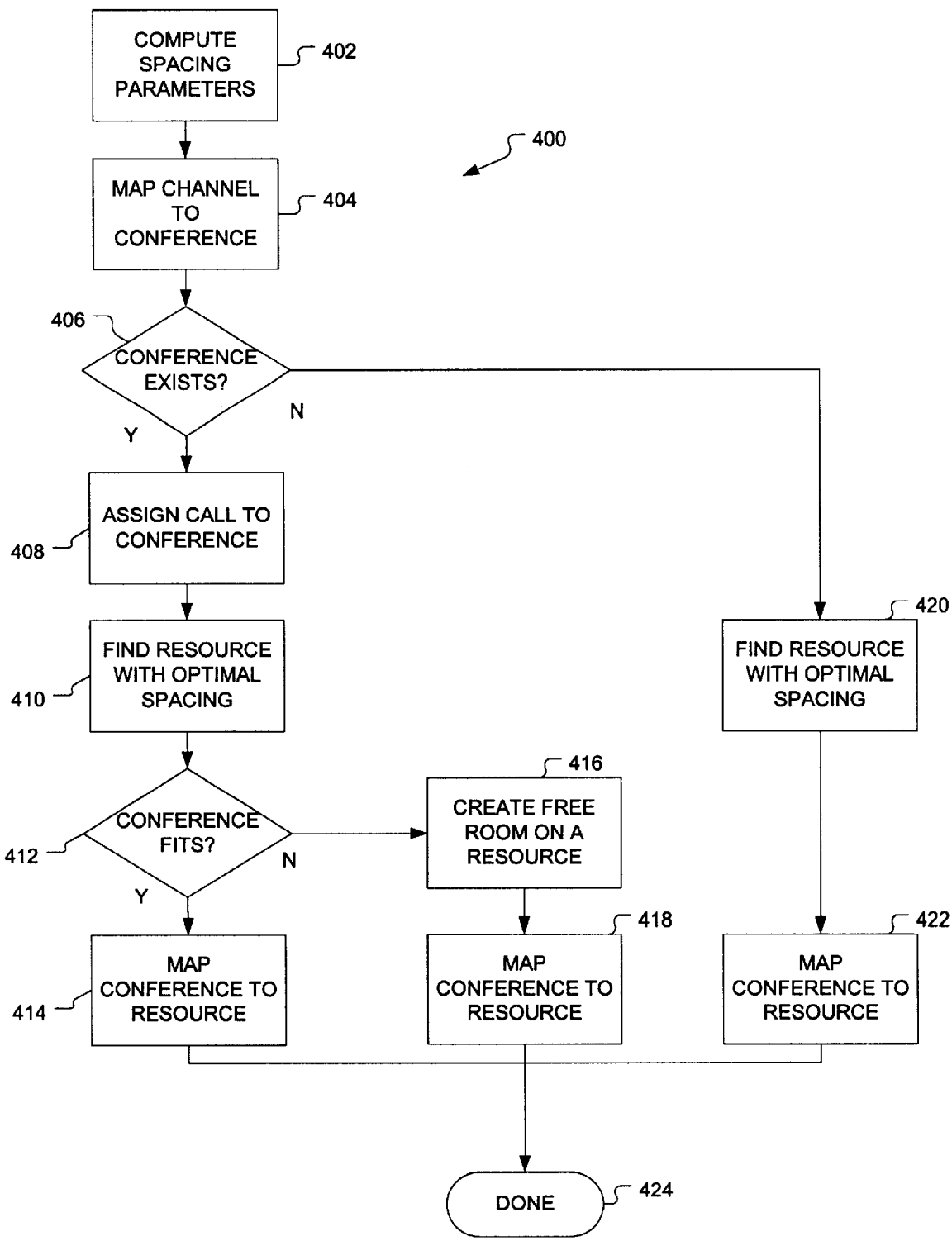
FIG. 4 is a flow chart of a method for managing audio conferencing resources according to the invention.

FIG. 4 is a flow chart of a method for managing audio conferencing resources according to the invention. Generally, a resource mapping algorithm is used to parameterize the capacity of each DSP resource for additional channels, and to allocate resources so that capacity is normalized across numerous DSP resources.

The process 400 begins with step 402 where spacing parameters are computed. A spacing parameter may be determined for each DSP resource in the system. An example calculation is:

If NumConfs>0 then
　Spacing=FreeLines/NumConfs
Else
　Spacing=FreeLines+FreeDist/MaxLines
Where
　NumConfs=number of active conferences on the resource
　FreeLines=number of unused DSP leads on the resource
　FreeDist=number of free lines on adjacent resources
　MaxLines=maximum number of possible active lines It will be appreciated that a number of different techniques and formulae may be used to calculate spacing parameters that are indicative of the capacity for growth of conferences on a DSP resource. Further, conference size could be tracked over time, and spacing adjusted according to whether conferences are growing or shrinking.

In step 404, a new line or channel is mapped to a conference. In step 406, a determination is made of whether the conference exists.

If the conference exists, then the call on the new line is assigned to the existing conference, as shown in step 408. A resource with optimal spacing may then be found for the existing conference, as shown in step 410. This may be determined by, for example, iteratively examining spacing parameters calculated in step 402, and selecting a resource that has the greatest capacity to handle additional calls, as indicated by the spacing parameter associated with the resource. As shown in step 412, it is then determined whether the conference fits on the selected resource. If the conference fits, then the process 400 may proceed to step 414 where the conference may be mapped to the resource. This may include mapping each logical channel associated with the conference to physical channels on a single resource.

If the conference does not fit, then the process 400 may proceed to step 416 where room for the conference is created on a resource. This step may be performed by rearranging the mapping of logical channels to physical channels, as will be explained in greater detail with reference to FIG. 5. Once free room on a resource has been created in step 416, the process 400 may proceed to step 418 where the conference is mapped to the resource. Returning to step 406, if no conference exists, then the process proceeds to step 420 where a resource with optimal spacing is located. This may be determined by, for example, iteratively examining spacing parameters calculated in step 402, and selecting a resource that has the greatest capacity to handle additional calls, as indicated by the spacing parameter associated with the resource. As shown in step 422, the conference may then be mapped to the resource.

When the conference has been mapped to a resource, as shown in step 414, step 418, or step 422, the process 400 is done, as shown in step 424. It will be appreciated that the above steps may be carried out in different orders. For example, a resource may be selected before a new call is added, although this may increase the likelihood that the conference does not fit on the selected resource.

Figure 5:
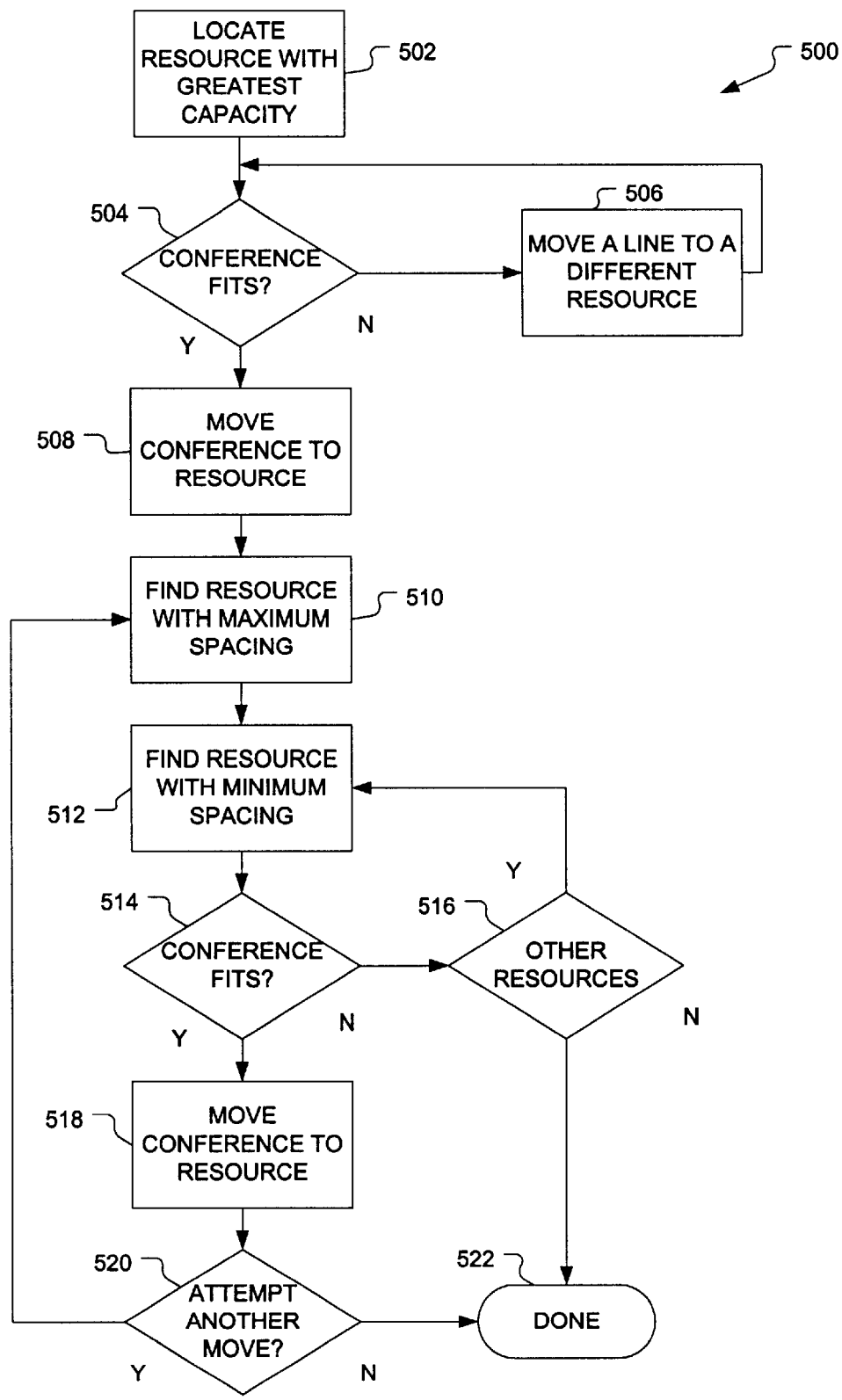
FIG. 5 is a flow chart of a method for rearranging channels within an audio conferencing system.

FIG. 5 is a flow chart of a method for rearranging channels within an audio conferencing system. The method 500 may be used to create room on a resource for a conference, as for example, in step 416 of the method shown in FIG. 4, when a new line is added to the conference. In one embodiment, the method 500 may be performed by the DSP units 102 in response to a single command issued from the host 116. Each DSP resource 106 may have channels reserved for responding to this command.

When a new line is added to a conference, the method 500 begins with step 502, where a resource with the greatest capacity is located. This may be performed, for example, by iterative inspection of the spacing parameters discussed in reference to FIG. 4. When the resource with the greatest capacity has been located, it is determined whether the conference may fit on the located resource, as shown in step 504. If the conference does not fit on the resource, a line on the resource may be moved to a different resource, as shown in step 506, and as explained in greater detail with reference to FIG. 6 below. The method 500 may then return to step 504 where a new determination is made. If the conference fits on the resource, then the method 500 proceeds to step 508 where the conference is moved to the resource located in step 502.

Conferences may then be reallocated among resources. As shown in step 510, a resource with the maximum spacing is located. This may be determined by inspecting a spacing parameter, such as that described above, for each resource in the system. As shown in step 512, a resource with the minimum spacing is located. It will be appreciated that other criteria may be applied to these steps. For example, the maximum and minimum may be determined for adjacent DSP resources 106, or adjacent DSP units 102, which may reduce overhead required to move conferences. As another example, the minimum spacing may be further qualified to conferences of some predetermined size so that conference moves are not performed for conferences that use all or most of a resource.

It may then be determined if the conference on the resource with the minimum capacity may be moved to the resource with the maximum capacity, as shown in step 514. If a conference, such as the largest conference, on the resource with the minimum capacity can fit on the resource with the maximum capacity, then the conference may be moved, as shown in step 518. The method 500 may then proceed to step 520, where another move may be tried. It will be appreciated that the method 500 may only perform a single move when invoked, or perform some predetermined number of moves, or may perform moves until some criterion is met, such as the maximum spacing identified in step 510 being equal to, or within some range of, the minimum spacing identified in step 512. If another move is to be attempted in step 520, then the method 500 returns to step 510 where a new resource with maximum spacing is identified. If another move is not to be attempted in step 520, then the method 500 may conclude, as shown in step 522.

If, in step 514, the conference does not fit on the identified resource with the maximum spacing, then the method 500 proceeds to step 516 where it is determined whether there are other resources to try. If there are other resources, then method 500 returns to step 512 where the resource with the next smallest spacing is found. If no other resources are available to be tried, then the method 500 may conclude, as shown in step 522.

Figure 6:
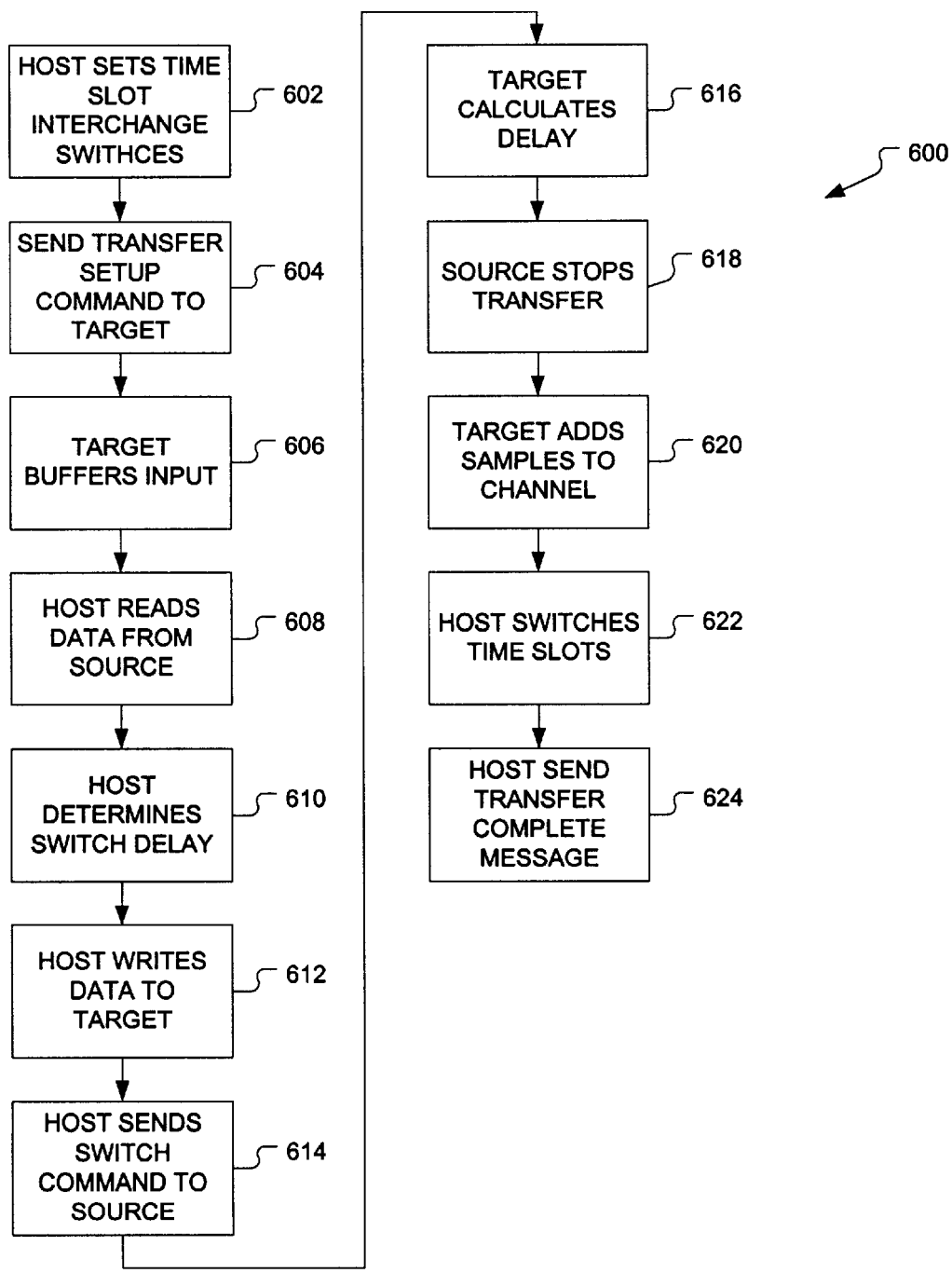
FIG. 6 is a flow chart of a method for transferring a channel in real time.

FIG. 6 is a flow chart of a method for transferring a channel in real time. When moving conferences as described above, or when moving individual lines among resources, as may be desired from time to time, audio continuity may be maintained by providing a technique for moving lines that does not drop or delay any audio data. It will be appreciated that, although one technique for realizing this type of transfer within the system 100 is realized below, other techniques are possible and may be usefully practiced with the system. It will further be appreciated that the foregoing method 600 may be applied to transfer a number of lines or channels at the same time.

The method 600 begins with the host setting the time slot interchange ("TSI") for a target resource, i.e., the resource to which a line is to be moved, to receive data from a source resource, i.e., the resource from which a line is to be moved, as shown in step 602. As shown in step 604, a transfer command may then be issued from the host to the target resource. In response to the transfer command, the target buffers input from the source, as shown in step 606. The host may wait for a number of frames of data while one or more samples are buffered by the target. The host then reads data from the source, as shown in step 608. this may include data associated with the line and stored in the data structure 300 described above. The host then determines a switch delay, as shown in step 610, by, for example, performing a sample count. A sample count with adequate delay for real time processing may be determined by, for example, examining state data for the lines on the target and source, and may include an additional number of counts as a safety margin.

As shown in step 612, the host may then write state data for the line to the target. This may include a switch command to be executed by the target. The switch sample count, as determined above, may be included as a parameter of this command. In response to this command, the target may then update state information by inspecting unprocessed samples in the buffer and comparing these to state data received from the host. As shown in step 614, a switch command may then be issued from the host to the source. This command may include the switch sample count as a parameter. As shown in step 618, the source may stop transferring samples, or adding data to the conference, when the sample count is reached. The source may continue providing conference output at this time. As shown in step 620, the target may add samples, including the last sample up to the sample count, from the source.

As shown in step 622, the host may then switch the TSI switches on the network card to take data from the time lot associated the new (i.e., target) resource. The host may sleep for a period equal to the sample count prior to issuing this switch command. As shown in step 624, the host may then send a transfer complete message to the source to conclude the transfer. Other functions may be performed to complete the transfer, including, for example, the host marking the source line as invalid.

Figure 7:
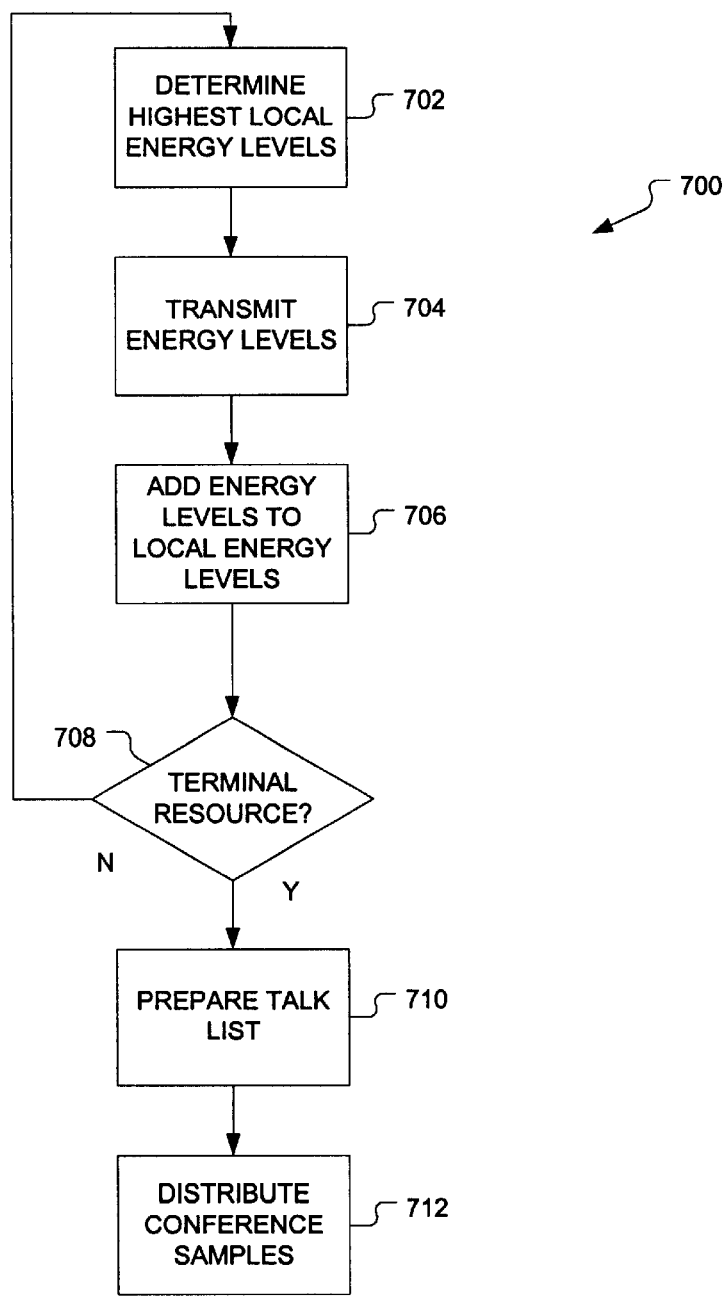
FIG. 7 is a flow chart of a method for linking conferences across physical resources.

FIG. 7 shows a flow chart of a method for linking conferences across physical resources. Periodically during conference management, a single conference may expand beyond the capacity of a single resource. This may present particular difficulties since each DSP resource 106 may not have direct access to each time slot on the third bus 122 that interconnects DSP units 102 and network interface cards 114. In the linking method 700, intra-DSP resource 106 links may be formed using local streams within the switch 104 of a DSP unit 102, while inter-DSP resource 106 links may be formed using the third bus 122 that interconnects the DSP units 102. In one embodiment, a link line is reserved for data communications between each adjacent DSP resource 106, and between each DSP unit 102. The link line may be a duplex (e.g., using two time slots) connection to enable bi-directional communication among all of the DSP resources 106. There is therefore provided herein a method for establishing bidirectional communications among a plurality of DSP resources 106.

The method 700 begins when each resource determines the highest local energy levels for channels in a conference, as shown in step 702. This may be a predetermined number of channels, such as three, suitable for inclusion in a talk list for active participation in a conference. As shown in step 704, the highest local energy levels are then transmitted to an adjacent node. This step may be performed unilaterally, for example where a resource has only one adjacent node, or in response to the receipt of energy levels from an adjacent resource where, for example, the resource has a number of adjacent resource. A receiving resource then sorts the received energy levels into the receiving resource's list of local energy levels to generate a composite list of highest energy levels. As shown in step 708, if the receiving resource is a terminal resource, i.e., the resource does not have further resources to which the energy levels should be transmitted, then the method 700 proceeds to step 710. If the receiving resource is not a terminal resource, then the method 700 returns to step 702 where a set of highest energy levels is again determined.

When a terminal resource has been reached, a talk list may be prepared, as shown in step 710, including the relative location of each talk list channel to the terminal resource. The relative location may be, for example, "left", "right"or "middle" (local), where transmission of energy levels is performed linearly along the busses, or may be "port 1", "port 2", and so on where more complex topologies are used. In one embodiment, all resources are arranged in a chain with a "right" data link line and a "left" data link line. These data link lines are formed using time slots of the third bus 122 and local busses of each DSP unit 102, and may be used to transfer data among resources. In this embodiment, relative locations may follow the left-middle-right convention noted above. The terminal resource prepares a talk list that includes the highest energy level channels, and scales and sums these channels as appropriate into a single conference for output. As shown in step 712, the samples for the conference may then be distributed to each resource using the data link lines noted above. The samples distributed in step 712 may be distributed at the same time that new energy levels are being determined (per step 702), provided that there is sufficient data capacity within the system for both types of data to be transmitted simultaneously. Further, it will be appreciated that new conference samples may be available for each frame transmitted on the busses, so that audio continuity may be maintained. However, changes to the talk list may occur at some different frequency.

Under control of the host, the techniques described above may be used to achieve a fault-tolerant conferencing system. A resource loss or resource failure may result from a number of causes. Power may be lost to the audio conferencing system 100, or some subcomponent thereof. Individual discrete electronics components may fail. Or the system 100 may be configured to include hot-swappable components so that DSP units 102 may be physically removed and reinserted into the system 100 while the system is operating. Under any of these conditions or other conditions, either intentional or unintentional, operation of some component of the system 100 may be compromised.

The host 116 may, for example, periodically test each DSP unit 102, and/or each DSP resource 106, referred to here collectively as "physical resources", to ensure that the units and resources are operating. The test may be through a simple query and response, or may invoke one or more diagnostic routines at the DSP unit 102 level, or at the DSP resource 106 level. The units and resources may also self-test periodically, and transmit responses to the host 116, or tests may be initiated at the occurrence of some unexpected system event, such as an unsuccessful communication over one of the data links described above. Should the host 116 detect a failure, the host 116 may respond by reallocating lines and/or conferences to other physical resources that are functioning properly. The host 116 may transfer lines and conferences directly to any physical resources have adequate capacity, or the host 116 may perform a reallocation according to the techniques described above.

It will be appreciated that each of the above steps in FIGS. 4–7 may be performed by computer executable code executing on the host 116, executing on one or more of the processors 110 of the DSP units 102, executing on the DSP resources 106 where the DSP resources are programmable, or executing on some combination of these components. The host 116 may control all of the above steps, or some of the steps, with other steps performed by other components. The code may be generated using a structured programming language such as C or FORTRAN, an object oriented program such as C++, Visual Basic, or Java, or an assembly or machine code, or some combination of these. Each component may be a compiled, or interpreted.

While the invention has been disclosed in connection with the preferred embodiments shown and described in detail, various modifications and improvements thereon will become readily apparent to those skilled in the art. For example, a channel mapping routine is described that spaces conferences evenly across system resources. However, uneven spacing may be desired where, for example, a DSP resource is reserved to ensure fault tolerance, or by host command so that a DSP unit may be removed from the system or replaced. Similarly, the invention is not intended to be limited to a single method for normalizing spacing between conferences, and other enhancements may be made, such as remapping conferences only at the beginning of a new conference or at the end of a conference, even where callers may be added to, or dropped from, a conference. Accordingly, the spirit and scope of the present invention is to be limited only by the following claims.

What is claimed is:

1. A method for managing channels within an audio conferencing system comprising:

receiving a call on a channel, the call associated with a conference;

identifying a first resource having a predetermined capacity to receive additional conferences, the first resource having a plurality of channels and operating under control of a processor to handle audio conferences;

mapping the channel to one of the plurality of channels of the first resource if the capacity of the first resource is sufficient to add the channel;

moving at least one of the plurality of channels of the first resource associated with a second conference to at least one other resource if the capacity of the first resource is not sufficient to add the channel;

for respective conferences, determining a predetermined number of highest talk level channels associated with the respective conference based on a comparison of channels of the resources having channels associated with the respective conference, the predetermined number independent of a total number of resources having channels associated with the respective conference; and summing the predetermined number of highest talk level channels as output for the respective conference.

2. The method of claim 1 further comprising linking a plurality of resources to provide a conference that is distributed among the plurality of resources.

3. The method of claim 1 wherein the first resource is a digital signal processor and the second resource is a digital signal processor.

4. The method of claim 1 wherein the predetermined capacity to receive additional conferences is determined using a spacing parameter, the spacing parameter indicative of a capacity for growth of conferences on a resource.

5. The method of claim 1 wherein moving a channel includes moving the channel in a manner that is inaudible to a human listener.

6. The method of claim 1 further comprising reallocating conferences among a plurality of resources at predetermined times.

7. The method of claim 6 wherein predetermined times include at least one of fixed intervals, the beginning of a new conference, or the end of an existing conference.

8. An audio conferencing system comprising:

a plurality of network interface cards connected by a first bus to a host and connected by a second bus to a plurality of digital signal processing units, and further connected to one or more telecommunications lines, each digital signal processing unit comprising a plurality of digital signal processing resources configured to manage channels in one or more audio conferences associated with one or more of the telecommunications lines, and each digital signal processing unit including a processor connected in a communicating relationship with the host and connected in a communicating relationship with the digital signal processing resources of the digital signal processing unit, each digital signal processing unit further including a memory, the memory storing state information relating to one or more audio conferences and the memory connected in a communicating relationship with the host, and each digital signal processing unit further including a switch for selectively coupling the digital signal processing resources of the digital signal processing unit to the second bus, the host accessing the processor, memory, and switch of one or more of the digital signal processing units to dynamically assign digital signal processing resources to one or more conferences present within the audio conferencing system.

9. The system of claim 8 wherein the first bus includes a time-slot interchange bus.

10. A method for managing conferences within an audio conferencing system, the method comprising:

identifying a first resource with a predetermined capacity to receive additional conferences, the first resource having a plurality of channels and operating under control of a processor to handle audio conferences;

identifying a second resource with a predetermined capacity to receive additional conferences, the second resource having a plurality of channels and operating under control of a processor to handle audio conferences, the capacity of the second resource being less than the capacity of the first resource, and the second resource including a conference;

moving the conference on the second resource to the first resource if the first resource has a capacity to include the conference, and attempting to identify a third resource if the first resource does not have the capacity to include the conference;

for respective conferences, determining a predetermined number of highest talk level channels associated with the respective conference based on a comparison of channels of the resources having channels associated with the respective conference, the predetermined number independent of a total number of resources having channels associated with the respective conference; and summing the predetermined number of highest talk level channels as output for the respective conference.

11. The method of claim 10 further comprising repeating identifying a first resource, identifying a second resource, and conditionally moving the conference at predetermined times to balance a distribution of conferences among a plurality of resources.

12. The method of claim 10, comprising:

establishing a link line from the first resource to the second resource; and transmitting data from the first resource to the second resource.

13. The method of claim 12 wherein the data includes talk levels for one or more lines participating in a conference.

14. The method of claim 12 wherein the link line is formed using a time-slot interchange bus.

15. The method of claim 12 further comprising transmitting data from the second resource to the first resource.

16. The method of claim 15 further comprising establishing a plurality of bi-directional links among a plurality of audio conferencing resources.

17. The method of claim 12 wherein the data includes state data for one or more of the one or more lines or conferencing resources.

18. The method of claim 1, comprising:

determining a switch delay indicative of a delay for switching a line from a source resource to a target resource;

buffering audio data for a line from the source resource at the target resource for an amount of time at least as great as the switch delay, the audio data including talk data for the line;

transferring conference data for the line from the source resource to the target resource, the conference data including state data for the line;

switching the line from the source resource to the target resource; and using the buffered audio data to maintain audio continuity while switching the line.

19. A method for managing audio conferencing resources comprising:

detecting a loss of a first physical resource, the first physical resource being a resource for conducting at least one audio conference;

identifying one or more audio conferences of the at least one audio conference associated with the first physical resource;

identifying a second physical resource, the second physical resource being a resource for conducting at least one audio conference, and the second physical resource having a capacity for the one or more conferences;

allocating the one or more conferences to the second physical resource;

for respective conferences, determining a predetermined number of highest talk level channels associated with the respective conference based on a comparison of channels of the physical resources having channels associated with the respective conference, the predetermined number independent of a total number of physical resources having channels associated with the respective conference; and summing the predetermined number of highest talk level channels as output for the respective conference.

20. The method of claim 19 wherein the loss is due to at least one of a power failure or a component failure.

21. The method of claim 19 wherein the loss is due to an intentional removal of a resource.

22. The method of claim 19 further comprising repeating the steps of detecting a loss, identifying one or more audio conferences associated with the first physical resource, identifying a second physical resource and allocating the one or more conferences to the second physical resource continuously.

23. The method of claim 1, comprising:

detecting a loss of one of the at least one other resource;

identifying one or more lines of an audio conference associated with the other resource; and allocating the one or more lines to one of the first or second resources.

24. The audio conferencing system of claim 9, wherein:

each of the plurality of network interface cards couples one or more lines to the time-slot interchange bus using fixed time slots, the switch operable under control of the host to couple with one or more predetermined time slots of the time-slot interchange bus; and a local time-slot interchange bus, the local bus transmitting data among the digital signal processing resources and the switch, whereby any one of the one or more lines can communicate with any one of the digital signal processing resources and whereby a time slot associated with the line on the time-slot interchange bus is maintained.

* * * * *